May 24, 1966

C. L. CRAWFORD 3,252,886

METHOD AND APPARATUS FOR PYROLYZING
SOLID CARBONACEOUS MATERIALS

Filed Feb. 2, 1962

INVENTOR.
CLARENCE L. CRAWFORD

BY

Troms, Birch, Swindler & McKie
ATTORNEYS

United States Patent Office 3,252,886
Patented May 24, 1966

3,252,886
METHOD AND APPARATUS FOR PYROLYZING SOLID CARBONACEOUS MATERIALS
Clarence L. Crawford, 550 W. Highland Ave., Sierra Madre, Calif.
Filed Feb. 2, 1962, Ser. No. 170,742
37 Claims. (Cl. 208—11)

This invention relates to the production of oil from solid carbonaceous materials, and more particularly, to a process for economically producing oil from oil shale, bituminous sands, peat and the like wherein solid heat-carrying bodies are utilized in thermally treating the carbonaceous solids and an effluent vapor ultimately is produced which is substantially free from entrained solids. In addition, this invention relates to an apparatus and a system containing apparatus which are employed to effect the production from solid carbonaceous materials of effluent vapor which is characterized by a relatively low entrained-solids content.

Hydrocarbon values resident in solid carbonaceous materials such as oil shale, bituminous sands, coals and the like generally are recovered therefrom by a method wherein the carbonaceous solids are thermally treated to provide an effluent vapor and the vapor subsequently is condensed with the resultant formation of an oil. Accompanying the production of the effluent vapor in such thermal treatments of solid carbonaceous materials is the formation of solid pyrolysis residue, referred to hereinafter in the specification and claims as "spent material" or "spent solids."

An appreciable amount of the spent material in the form of finely divided particles becomes entrained in the effluent vapor produced in the pyrolysis zone and is carried from the pyrolysis zone suspended in the exiting vapor stream. Upon the condensation of the effluent vapor stream containing the entrained solids, the solids are trapped in droplets of oil during the condensation of the vapor and consequently an undesirable "dirty" oil is provided.

The presence of appreciable quantities of entrained solids in effluent vapor derived from solid carbonaceous materials is highly undesirable. Equipment employed in the handling and subsequent treatment of the effluent vapor may become fouled due to the presence of the fine solid materials and impractical maintenance and replacement costs thereby resulting. In addition, at temperatures characteristic of pyrolysis treatments of solid carbonaceous materials, entrained, fine spent material, especially that produced from oil shale, when present in relatively large proportions, may act as a catalyst and effect slight cracking of the desired hydrocarbon constituents in the effluent vapor. While in some instances slight cracking of the heavier constituents of the vapor may be satisfactory, generally it is desired to avoid any decomposition of the vaporous effluent due to the problems attending the resulting production of coke and light gases, including, inter alia, reduction in oil yield, dilution of oil vapor stream, and equipment fouling.

Moreover, crude oil derived from carbonaceous solids containing significant quantities of solid materials in finely divided form usually is unsatisfactory for commercial utilization. The presence of suspended solids in the crude oils give rise to fouling of equipment employed in refining, pumping, storing and like handling operations with a resultant increase in the over-all maintenance and replacement costs of such items. In addition, the presence of suspended pyrolysis residue in such oils is undesirable due to the additional cost entailed in pumping, storing, refining, etc. a volume of fluid which is greater than of commercial value. Such additional costs usually are of significant magnitude since deposits of solid carbonaceous materials generally are remote from population centers and cheap transportation facilities such as navigable waters. Consequently, the only economically practical means for conveying crude oils derived from such deposits to market is by pumping them over relatively long distances through pipe line networks. Accordingly, the refining industry considers oils derived from such sources undesirable if characterized by a solids content greater than about 1% by weight.

Pyrolysis residue entrained in the effluent vapor leaving the pyrolysis zone is characterized by having sensible heat value and, since it also contains fixed carbon, combustion heat value. In some cases the amount of fine materials entrained in the exiting vapor may attain a value as high as above 10% of the total carbonaceous solids charged to the pyrolysis zone. In order to maintain the efficiency and economy of such methods utilized to recover the desired hydrocarbon values from the solid carbonaceous material at practical levels it generally is imperative that the heat value of the entrained residue be recovered. Recovery of the heat value of the solid materials suspended in the effluent vapor is especially important in such methods wherein, due to the particular conditions under which the pyrolysis is conducted, unpyrolyzed solid carbonaceous material in finely divided form also is present in the exiting effluent vapor stream.

One method for thermally treating solid carbonaceous materials involves the utilization of inert heat-carrying solid bodies. In processes of this type, the carbonaceous solid generally is preliminarily crushed to be of a smaller average size than the heat-carrying bodies and the crushed carbonaceous solid then is pyrolyzed in a rotating drum by being maintained for a requisite time period in milling-to-milling contact with the suitably hotter heat-carrying bodies.

Since the solid carbonaceous material initially is in a finely divided state and since the solid-to-solid milling contacting between the carbonaceous solid and the heat-carrying bodies produces additional finely divided material, the problem of dust entrainment in the effluent vapor may become more aggravated in methods utilizing milling heat-carrying bodies in a rotating pyrolysis zone. Accordingly, methods for producing oil from solid carbonaceous materials employing such a technique may not be commercially satisfactory unless suitable means are utilized to effect an efficient removal of dust from the effluent vapor leaving the pyrolysis zone.

Another basic method for thermal treating such carbonaceous solids to recover the desired hydrocarbon values which have found widespread utilization in the art involves the use of the fluidization technique in effecting the requisite transfer of heat for pyrolysis to the carbonaceous solids. Particular embodiments of such a method involve the use of solid heat-carrying bodies in addition to the use of a gasiform material which forms the desired completely fluidized bed of solids in the pyrolysis zone.

In the formation of a completely fluidized solids bed containing a significant proportion of finely divided solids, it is inherent in the process that appreciable amounts of very fine materials undesirably become entrained in the fluidizing gas stream and are carried out of the pyrolysis zone suspended in the effluent vapor-fluidizing gas mixture. The problem of entrainment of fine materials in the vapor exiting from the pyrolysis zone is further aggravated by the fact that the spent solids produced during the pyrolysis of carbonaceous solids, particularly oil shales, are relatively friable materials. The excessive battering of these friable spent solids in a fluidized solids bed undesirably produces an increasing amount of finely divided solids, thereby increasing the concentration of "fines" in the solids bed susceptible to entrainment by the fluidizing gas.

Accordingly, methods for recovery oil from solid carbonaceous materials wherein the fluidization technique is employed usually are not commercially satisfactory unless suitable means are used to effect the desired removal of entrained solids from the effluent vapor recovered from the pyrolysis zone.

One technique which has been suggested to reduce the entrained solids content of effluent vapor derived from carbonaceous solids by thermal treatment thereof involves passing the vapor stream from the pyrolysis zone through a gas-solids separator, usually of the cyclone type, to effect the removal of the suspended bodies. The use of such a technique, however, has not proven to be completely satisfactory due to the fact that cooling of the vapor in the separator with the resultant undesirable condensation of the heavier constituents thereof is a problem.

Methods also have been suggested to effect the removal of finely divided solids from the oil resulting upon the condensation of the effluent vapor produced by pyrolyzing solid carbonaceous materials. The more frequently utilized method for separating solids from the crude oils so produced involves the utilization of a centrifuging technique. This type of a solids removal treatment frequently is not suitable, however, in effecting the degree of separation required by refining specifications and furthermore generally is commercially undesirable in terms of power requirement, equipment cost and maintenance.

Accordingly, it is the primary object of the present invention to provide a method for treating effluent vapor derived by contacting solid carbonaceous materials with heat-carrying bodies wherein an effluent vapor is provided which is characterized by a relatively low entrained-solids content.

It is another object of the present invention to provide a method for producing an effluent vapor from a solid carbonaceous material wherein the recovery of the vapor characterized by a relatively low entrained-solids content is achieved by economic means.

It is an additional object of the present invention to provide a method for producing an effluent vapor from a solid carbonaceous material wherein problems attendant heretofore available techniques due to entrained-solids in the vapor are substantially eliminated.

It is a further object of the present invention to provide a method for producing an effluent vapor from a solid carbonaceous material wherein the acquisition and maintenance costs of equipment utilized in handling the vapor and the products subsequently recovered from the vapor are substantially reduced.

It is still an additional object of the present invention to provide a method for producing an effluent vapor from a solid carbonaceous material, which effluent vapor may be handled in equipment with relatively little fouling of the equipment thereby resulting.

It is still another object of the present invention to provide a method for producing an effluent vapor having a relatively low entrained-solids content from a solid carbonaceous material without the danger of the heavier constituents thereof condensing in entrained-solids removal equipment.

A still further object of the present invention is to provide a method for producing a substantially solids-free oil from a carbonaceous solid without the necessity of utilizing relatively expensive oil centrifuging techniques.

It is a particular object of the present invention to provide a method for recovering from oil shale an oil characterized by a relatively low solids content.

It is another particular object of the present invention to provide an apparatus for removing entrained solids from effluent vapor produced by thermally treating solid carbonaceous materials wherein a substantially solids-free vapor is produced economically and efficiently without the condensation of any constituents of the effluent vapor.

Broadly described, the present invention provides a process for the production of a substantially solids-free oil from a solid carbonaceous material comprising pyrolyzing said carbonaceous material in a pyrolysis zone by contacting said carbonaceous material with hotter heat-carrying bodies to provide a spent pyrolysis solid residue and an effluent vapor containing entrained solids; recovering said solids-containing effluent vapor from said pyrolysis zone; recovering said heat-carrying bodies from said pyrolysis zone; transferring said heat-carrying bodies to a confined first solids removal zone; introducing said solids-containing effluent vapor into said first solids removal zone to contact said heat-carrying bodies therein, thereby effecting the removal of a portion of said entrained solids from said vapor to produce an effluent vapor having a reduced solids content; and passing said vapor of reduced solids content through a second vapor-solids separation zone to effect the removal of substantially the remainder of the entrained solids from said vapor, maintaining said second vapor-solids zone at a temperature requisite to prevention of condensation of said vapor, and recovering substantially solids-free effluent vapor from said second vapor-solids removal zone.

Preferably, the second vapor-solids zone is located within the first solids removal zone and is externally heated by the heat-carrying bodies.

The present invention also embraces an apparatus for removing dust from a condensible vapor, comprising a chamber, inlet means in the upper portion of said chamber for introduction of heated solid material and a dust-containing condensible vapor, a solids outlet positioned in the lower portion of said chamber, a vapor-solids separation means in association with said chamber, a vapor inlet to the vapor-solids separation means in communication with said chamber, a solids outlet from the vapor-solids separation means, a vapor outlet from said vapor-solids separation means, and means for maintaining an elevated temperature in said vapor-solids separation means.

In its preferred form the apparatus of the invention comprises a chamber having inlet means in the upper portion thereof for introduction of heated solid material and dust-containing condensible vapor, a solids outlet positioned in the lower portion of said chamber, a vapor-solids separation means located within said chamber and spaced from the walls thereof, a vapor inlet to the vapor-solids separation means in communication with said chamber, a solids outlet from the vapor-solids separation means in communication with said chamber, and a vapor outlet from said vapor-solids separation means leading to the exterior of said chamber.

The carbonaceous materials contemplated for treatment by the method of the invention embrace any solid carbonaceous materials containing hydrocarbon values which can be recovered by a thermal treatment of the solid materials. The recovery of the hydrocarbon values is accompanied by the production of a solid residue, normally containing combustible carbon. It will be understood that as employed in the specification and claims of the application the terms "spent material" and "spent solids" are meant to refer to the solid residues produced by the pyrolysis of solid carbonaceous materials, including both partial and complete pyrolysis thereof. Such solid materials which suitably may be treated by the method of the invention include, without limitation, oil shales, bituminous sands, lignites, coals, such as brown coal, peat and the like. Oil shale deposits found in the United States usually are characterized by a recoverable oil content of about 20–50 gallons per ton of shale and upon essentially complete pyrolysis thereof, in addition to the oil vapors and noncondensible gases produced thereby, a solid residue is produced having a combustible fixed carbon content. Pyrolysis of such oil shales produces the preferred vapor-solids mixtures for treatment in accordance with the method of the invention.

The solid heat-carrying bodies contemplated in the method of the invention embrace any solids made up of materials which are inert in the process and maintain their physical characteristics under the conditions employed in the over-all process for pyrolyzing solid carbonaceous materials and recovery therefrom of a vaporous, substantially solids-free effluent in accordance with the method of the invention. More specifically, the bodies should consist of materials which do not decompose, melt or fuse at temperatures encountered in the pyrolysis and heat-carrying body reheating zones. In addition, it is preferred that the bodies themselves do not disintegrate to any appreciable extent when subjected to the physical and thermal stresses inherent in the process. It will be understood, of course, that in this respect disintegration is to be distinguished from gradual wear by attrition.

Suitable materials for use in preparing the heat-carrying bodies include, without limitation, iron, steel, alumina, ceramic compositions, spent ash and the like. It will be understood that as employed in the specification and claims of the application the term "spent ash" is means to refer to the solid residual materials remaining after the solid residue (spent material) produced in the pyrolysis of carbonaceous solids is burned to remove at least a portion of any combustible substances present therein. For example, in the specification and claims, the solid residue produced in the pyrolysis of oil shale is referred to as "spent shale" and the residual solid material remaining after spent shale is burned to combust any fixed carbon therein is referred to as "spent shale ash." In the case of materials, such as alumina and spent ash, which may be compressed into the desired shape and fired to form suitable heat-carrying bodies, these materials suitably may be combined with other additives which impart improved properties to the fired bodies such as compression strength and resistance to thermal shock. All of the heat-carrying bodies employed in a particular embodiment of the method of the invention may be made up of the same material. Alternatively, mixtures of bodies composed of dissimilar materials suitably may be employed.

The materials preferred for utilization in making heat-carrying bodies to be employed in pyrolyzing a particular type of carbonaceous solid in a specific embodiment of the present method, of course, will depend upon a consideration of the over-all economics of that process. When oil shales are to be treated in accordance with the present method, the heat-carrying bodies which are particularly preferred for use are formed of alumina due to the high heat conductivity, wearing qualities during the solid-to-solid heat exchange contact characterizing the process, and inertness of such bodies. The heat-carrying bodies preferably should be at least roughly spherical to facilitate their movement through the system and to achieve maximum efficiency in solid-to-solid heat transfer zones. Bodies preferred for use in the process are in the form of balls.

In the pyrolysis process with which the present invention preferably is employed the raw solid carbonaceous material initially is crushed by any suitable method to be of a suitable particle size. Preferably the raw carbonaceous material is reduced in particle size to be of such an average diameter that it is of a smaller value than that of the heat-carrying bodies employed, so that separation of the spent material produced in the pyrolysis and the heat-carrying bodies readily can be accomplished. Usually the average particle size of the raw carbonaceous solid feed stream is in the range of from about ⅜" to about ¾" and preferably is about ½". The crushed raw carbonaceous material at ambient temperatures then may be passed directly to the pyrolysis zone, although it is preferred that the raw solids feed stream be preheated.

Preheating of the crushed material suitably may be carried out either indirectly or directly with heat from any source available. One preferred method for preheating the crushed carbonaceous feed stream utilizes the residual sensible heat of flue gases previously employed in the process to supply heat to the heat-body heating zone. In such cases the technique preferred for utilization is to effect the desired heat transfer between the crushed raw material and the hot flue gases by entraining the carbonaceous solids in a gas lift line with the flue gas stream. The preheated raw material is then separated from the entraining gas in a gas-solids separation zone and passed to the pyrolysis zone.

The cool or preheated carbonaceous material is then passed into a pyrolysis zone which suitably may be in any form for carrying out the pyrolysis of carbonaceous solids such as a fluidized bed, a horizontal or slightly inclined rotating drum, a vertical stacked solids bed and the like, wherein it is contacted in solid-to-solid heat exchange contact with heat-carrying bodies having sufficient available heat to effect the pyrolysis of the carbonaceous material and produce effluent vapor and hot spent solid residues. Preferably the pyrolysis zone is in the form of a rotating drum wherein solid-to-solid milling contact between the heat bodies and carbonaceous solids is achieved. Preferably, the available heat of the heat-carrying bodies is such that essentially complete pyrolysis of the carbonaceous solids is effected with a maximum yield of hydrocarbon values being thereby achieved. For example, when oil shale is subjected to pyrolytic treatment, the heat supplied by the heat-carrying bodies to the oil shale is such as to raise the temperature of the shale in the range of from about 750° to about 950° F., preferably from about 800° to about 900° F. Temperatures in the pyrolysis zone greater than about 950° F. usually are avoided due to the fact that some slight cracking of valuable hydrocarbon product may occur under such conditions.

Although countercurrent flow of solids through the pyrolysis zone may be employed, in accordance with the preferred embodiment of the present method employing a rotating drum as the zone wherein pyrolysis is effected, the carbonaceous materials and heat bodies are passed through the pyrolysis drum in concurrent fashion. By the utilization of concurrent flow in lieu of countercurrent flow, the power requirements for moving the solids through the system are greatly reduced and the chance of coking occurring at the heat-body inlet end of the pyrolysis drum is essentially eliminated.

The actual temperature and amount of the heat bodies introduced into the pyrolysis zone in a particular embodiment of the present method, will depend upon, inter alia, the type of carbonaceous material being treated, the degree of pyrolysis desired, the inlet temperature of the carbonaceous feed, and the heat transfer characteristics of the heat-carrying bodies. Where oil shale is treated in accordance with the method of the invention and alumina balls are utilized as the heat-carrying bodies, the ratio of heat-carrying bodies to raw shale feed to the pyrolysis zone preferably is in the range of from about 0.6:1 to about 10:1, preferably from about 0.8:1 to about 3:1. In such oil shale treatments the alumina balls introduced into the pyrolysis zone usually are at a temperature in the range of from about 1200° to about 1800° F., preferably from about 1350° to about 1650° F.

In accordance with the invention, the heat-carrying bodies, cooled by giving up a portion of their heat to the carbonaceous material during pyrolysis, the effluent vapor and spent materials produced in the pyrolysis of the carbonaceous solids are then removed from the pyrolysis zone. The condensible effluent vapor containing fine solid materials suspended therein and the heat-carrying bodies are then sent to a dust removal treatment wherein the solids suspended in the vapor are removed preliminary to the vapor being passed to a recovery section. In the preferred dust removal procedure, the vapor is subjected to at least a two-stage treatment to effect the removal of suspended solids. In a first dust removal treatment, the solids-containing vapors are introduced into a first solids removal zone wherein the still hot heat-carrying bodies recovered from the pyrolysis zone are caused to collect in sufficient volume to form a bed of appreciable depth and are maintained in contact with the heat-carrying bodies from the pyrolysis zone. Part of the solids are removed from the vapor by contact with the heat-carrying bodies. It is believed that by contact electrification, effected by previous particle-to-particle contact in the process, the dust and heat-carrying bodies become differentially charged, and that a portion of the dust particles entrained in the effluent vapor are attracted to and thereby removed from the vapor by the heat-carrying bodies. The vapor, containing a reduced amount of suspended solids, is then passed through a vapor-solids separator, preferably of the cyclone type, constituting a second solids removal zone, wherein the remainder of the suspended solids in the vapor are substantially completely removed. When according to the preferred embodiment of the invention the vapor solids separator is located within the first solids removal zone, heat from the heat-carrying bodies prevents condensation of the high boiling constituents of the effluent vapor.

To obtain maximum efficiency in removing entrained solids from the effluent vapor, the second vapor-solids separation zone preferably is located within the first solids removal zone in such a manner that the outlet of the second vapor-solids separation zone is in juxtaposition with the heat-carrying body outlet from the first zone.

If the hot spent solids and cooled heat-carrying bodies produced in the pyrolysis zone have not already been separated inside the pyrolysis zone, as is described in U.S. Patent 2,592,738, separation of the spent materials and heat-carrying bodies recovered from the pyrolysis zone is then carried out by any suitable means such as by a screening operation. Separation of the spent materials and heat-carrying bodies easily can be accomplished when a significant difference in the average particle size between the two solid streams is maintained.

The heat-carrying bodies recovered from the pyrolysis zone and separated from the spent material are passed through the dust removal zone, as hereinabove described; then are reheated and recycled to the pyrolysis zone to effect the pyrolysis of additional raw carbonaceous material added thereto.

The reheating of the heat-transfer bodies employed in the process of the present invention satisfactorily may be carried out by any suitable means, such as in a pebble heater, a fluidized solids bed containing the heat-transfer bodies, and the like. In reheating the heat-transfer bodies, heat suitably may be imparted thereto by direct or indirect means employing any convenient source of heat.

Since spent materials produced in the method of the invention contain combustible material in the form of fixed carbon and any hydrocarbon values which were not driven therefrom and/or which were absorbed thereby in the pyrolysis zone, any desired portion of the combustible substances present in spent material recovered from the pyrolysis zone can be burned to provide at least a portion of the heat required for reheating the heat-carrying bodies to the temperature requisite to effect pyrolysis of the carbonaceous feed stock. Combustion of the spent material can be accomplished by any suitable manner, such as by forcing a combustion-supporting gas, such as air, through a fluidized bed of spent solids and then passing the hot flue gases and/or hot spent ash produced thereby in direct or indirect heat exchange relationship with the heat-carrying bodies. In a preferred embodiment of the method of the invention employing combustion of the spent solids in the heat body reheating step, hot flue gases containing fine hot spent ash entrained therein are passed directly through the heat body reheating zone to effect the desired heating of the heat-carrying bodies therein. In instances wherein the heat supplied by burning spent materials is insufficient to raise the temperature of the heat-carrying bodies to the desired level, a supplemental fuel suitably also may be burned to provide the additional heat required.

In the thermal treatment of some carbonaceous solids to recover oil therefrom, it may not be suitable to utilize combustion of the spent material in reheating the heat-carrying bodies. In such instances the heat-carrying bodies preferably are reheated in a pebble heater by being contacted with flue gases having heat value derived from the sensible heat of the spent solids under non-combustion conditions and the combustion heat of a fuel.

The sensible heat of the spent solids and the combustion heat of the fuel may be imparted to the flue gas employed to reheat the heat bodies in any suitable manner. Preferably a combustion-supporting gas initially is preheated by means of the sensible heat of the spent materials and subsequently the resulting preheated combustion-supporting gas is employed to burn the fuel to provide a flue gas of requisite temperature. Preferably, the spent solids recovered from the pyrolysis zone are entrained in a suitable line in heat exchange relationship with a combustion-supporting gas such as air, oxygen-containing flue gas and the like. The spent solids then are removed from the heated combustion-supporting gas in a suitable gas-solids separator, such as a cyclone, and the resultant gas is employed to ignite and burn the fuel to provide a flue gas of the desired temperature.

Combustion of the fuel in the preheated combustion-supporting gas provides hot flue gases which are then introduced into the bottom of a pebble heater and passed upwardly in heat exchange relationship through the descending bed of heat-carrying bodies. The amount of the fuel which must be combusted in order to fulfill the heat requirements of the process can be determined by a heat balance on the over-all system considering, inter alia, the total heat requisite for achieving the desired degree of pyrolysis, the potential heat valve of the fuel, the proportion of the sensible heat of the spend solids which can be recovered, and the heat exchange efficiency of the pebble heater. The heat requirements for a particular embodiment of the present invention, therefore, will vary depending upon the type of carbonaceous material being thermally treated and the particular heat-carrying bodies, fuel, and apparatus employed in the system.

When a fuel, other than the carbon present in the spent solids is employed in the heat-carrying body reheating step of the process, the fuel preferred for use is a portion of the effluent vapor produced in the process from which the least economic benefit can be gained on the market. Generally the portion recovered from the effluent vapor having the least value on the market is a gas oil fraction and, therefore, the gas oil fraction constitutes the preferred embodiment of the fuel employed in the heat-carrying body reheating step. When a portion of the effluent is used as the fuel, the portion suitably may be recovered therefrom with or without fractionation. Of course, the fuel employed suitably may be selected from any other normally solid, liquid or gaseous combustible materials such as coal, the petroleum oil stock, natural gas and the like which could be used separately, in combination with each other, or in combination with a portion of the effluent produced in the process.

Reheated heat-carrying bodies then are recovered from the bottom of the heat body reheating zone and recirculated to the pyrolysis zone by any suitable means such as by gravity, mechanical conveyance, pneumatic transmission and the like. In instances wherein flue gases are recovered from the heat-carrying body reheating zone, any residual sensible heat of the flue gases preferably is used elsewhere in the system. Such flue gases preferably are employed to preheat raw carbonaceous feed material, e.g., in a gas lift heater. In instances wherein the flue gases obtained from the heat-carrying body reheating zone contain entrained spent solids and/or spent ash, the entrained solids preliminarily may be removed before subsequent use.

The invention will be more fully understood by reference to the following detailed descriptions of the apparatus and method of the invention and the accompanying drawings of which:

Figure 1:
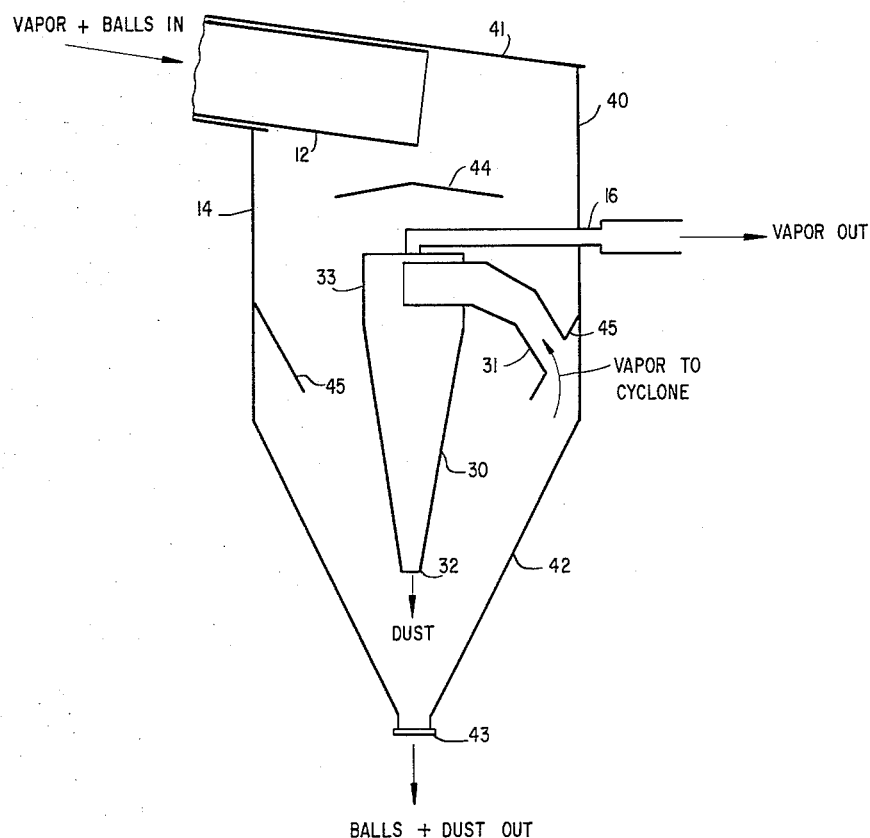
FIGURE 1 is a diagrammatic sectional elevation of the preferred form of the apparatus of the invention for removing suspended solids from effluent vapor.

With reference to FIGURE 1, numeral 14 designates a chamber for removing entrained solids from condensible vapors comprising a vertically disposed cylindrical shell 40 closed at its upper end by a top closure member 41 and closed at its bottom by a conical bottom closure member 42. Top closure member 41 is adapted with a heat-carrying body inlet conduit 12 extending therethrough into the interior of chamber 14. Although heat-carrying body inlet conduit 12 suitably may enter the top of chamber 14 at any angle without deviating from the scope of the invention, it is preferred, as shown in the drawing, that the heat body inlet conduit 12 be slightly downwardly inclined to facilitate the movement of heat bodies therethrough without allowing them to fall freely. As shown in the drawing, conduit 12 also serves as a common inlet to chamber 14 for effluent vapor containing entrained solids. It will be understood that the heat-carrying body and the effluent vapor inlets to the chamber suitably may be separate. A heat-carrying body outlet from chamber 14 is disposed at the apex of the conical bottom member 42. The angle at which the sides of conical member 42 slant downwardly and inwardly toward outlet 43 usually is in the range from about 20° to about 40°, and preferably is about 30° from the vertical. A cyclone separator 30 is located within chamber 14 and so positioned that the annulus formed by the external surfaces, represented in the drawing by numeral 33, and the walls of shell 40 is of sufficient area to allow the passage of heat-carrying bodies therethrough. Cyclone separator 30 is provided with a vapor inlet conduit 31, communicating with the interior of chamber 14. Although only one vapor inlet to cyclone separator 30 is shown in the drawing, a plurality of such conduits may be employed. Although any suitable vapor collecting means communicating with vapor inlet conduit 31 to internally located cyclone separator 30 suitably may be employed, the preferred vapor collecting means is the inwardly and downwardly extending baffle member 45 which extends about the outer portion of shell 40 as a peripheral baffle connected at its upper edge to the wall of shell 40. Preferably, the angle formed between the baffle member 45 and the wall of shell 40 is substantially equal to the angle at which the sides of conical bottom member 42 slant downwardly and inwardly. Cyclone separator 30 is provided with a vapor outlet conduit 16 which communicates between cyclone separator 30 and the exterior of chamber 14. A solids outlet 32 is located at the lower end of cyclone separator 30. Preferably, solids outlet 32 is coaxially disposed with heat body outlet 43 from chamber 14 to facilitate the passage of solids issuing from cyclone separator 30 through outlet 43 and out of contact with effluent vapor in chamber 14.

A baffle member 44 is positioned in the upper region of chamber 14 between heat body inlet 12 and cyclone separator 30. Baffle member 44 suitably may be of any design such as a conical member, a single horizontal plate, a slightly inclined plate, or a combination of plates inclined to the horizontal. The baffle member serves both as a means for protecting cyclone separator 30 from the impact of heat-carrying bodies entering chamber 14 through inlet conduit 12 and as a distribution means. Preferably, baffle member 44, as shown in the drawings, is a conical member positioned coaxially above cyclone separator 30. The annulus formed between baffle member 44 and the walls of shell 40 must be of such an area as to allow the passage of heat bodies therethrough.

Figure 2:
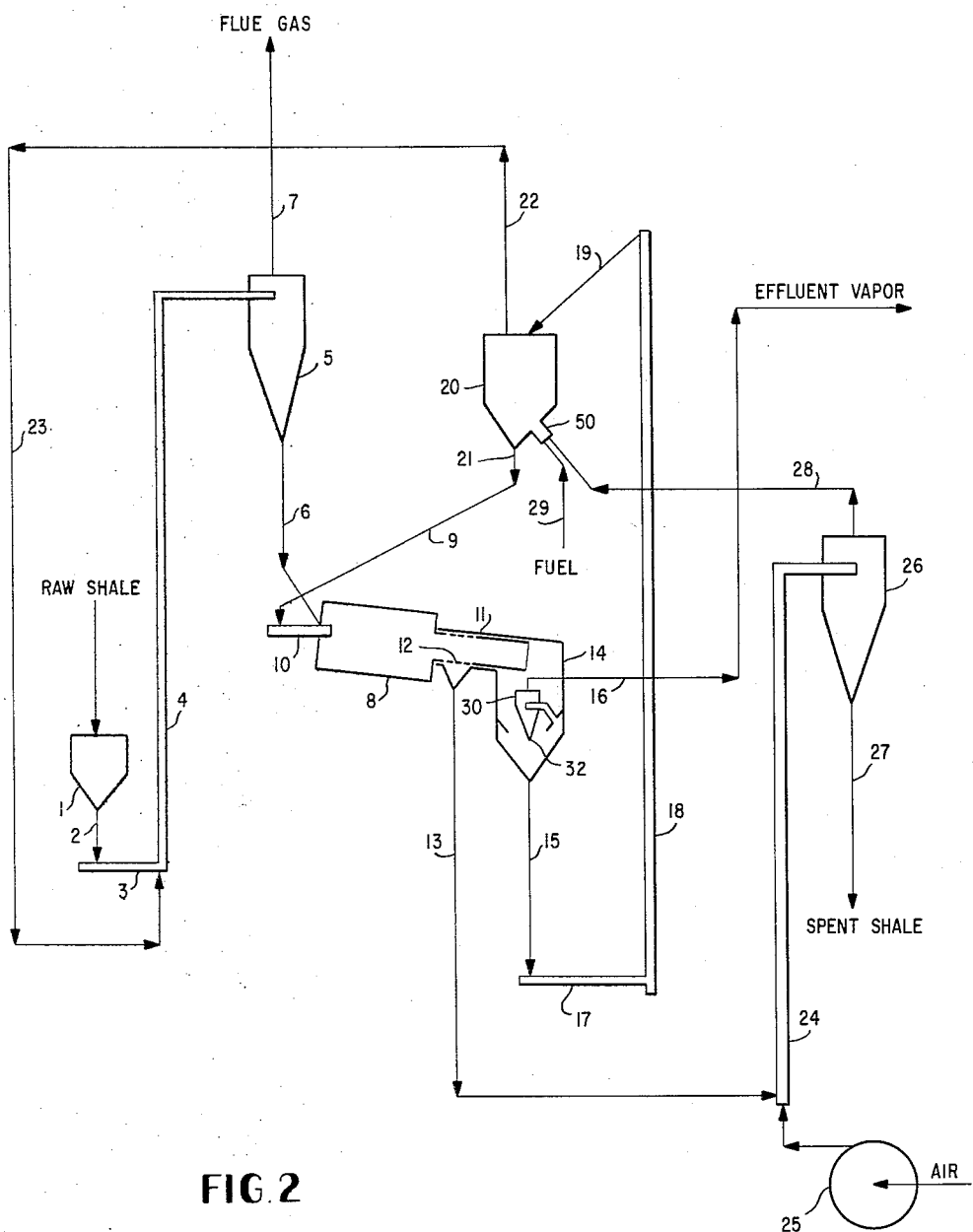
FIGURE 2 is a flow diagram of a preferred embodiment of the method of the invention wherein a Colorado oil shale is employed as the carbonaceous material to be pyrolyzed.

With reference to FIGURE 2, Colorado oil shale at about 50° F. crushed to an average particle size of about ½" in diameter is fed from a bin 1 via line 2 and feeder 3 to a raw shale lift heater 4 wherein it is contacted and entrained by flue gas having a temperature of about 1100° F. In the raw shale lift heater the raw shale feed is heated to a temperature of about 300° F. The preheated raw shale is then removed from the gas-solids suspension in a separator 5 and passed to a substantially horizontal rotating pyrolysis drum 8 via line 6. The cooled flue gas from which the heated raw shale has been removed passes from gas-solids separation zone 5 through line 7 and is vented to the atmosphere.

In pyrolysis zone 8 the preheated raw shale is contacted with hot alumina balls having a temperature of about 1570° F. and entering pyrolysis drum 8 via line 9 and feeder 10. The balls and shale pass concurrently through pyrolysis drum 8 whereby the heat of the balls is imparted to the shale with the production of an effluent vapor and spent shale solids. Effluent vapor and spent solids at about 870° F. and cooled balls at about 900° F. exit from pyrolysis drum 8 through line 11 which is adapted with a screen 12 having openings therein such that spent solids pass through while the passage therethrough of balls is precluded. The effluent vapor and cooled balls are then passed by means of line 11 to a surge chamber 14 wherein the contact between the balls and vapor effect the removal of a portion of the solids entrained in the effluent vapor.

Vapor from which a portion of the dust has been removed in chamber 14 is then passed via conduit 31 into cyclone 30 located within chamber 14. In cyclone 30 substantially the remainder of the entrained dust in the vapor is removed and the removed dust exits cyclone 30 by means of outlet 32. Substantially dust-free vapor is removed from cyclone 30 by means of line 16 which communicates with the exterior of chamber 14 and the vapor is passed to a recovery section not shown. Cooled balls containing the spent solids separated from the vapor are removed from chamber 14 by means of line 15 and passed to a ball elevator 18 via feeder 17. In ball elevator 18 the cooled balls are lifted to the top of a ball heater 20 into which they are introduced from elevator 18 by means of line 19.

The spent shale removed from pyrolysis drum 8 and separated from the cooled balls by means of screen 12 are passed via line 13 to a gas lift line 24. In gas lift line 24 the hot spent shale is contacted with and entrained in air at about 95° F. which is introduced into lift line 24 by a blower-compressor 25. The entrained spent shale transfers its sensible heat to the air, raising the temperature of the air to about 700° F. The air-spent solids suspension is then passed through a separator 26 wherein the entrained solids are removed from the preheated air stream. The separated solids pass from solid separator 26 through line 27 and are discarded or sent to heat recovery units not shown. The heated air from which the spent solids have been removed passes from separator 26 by means of line 28 and is introduced into a fuel combustion zone 50 joining the line 28 and the pebble heater 20.

A gas oil fraction recovered from the effluent vapor produced in the process is introduced by means of line 29 into fuel combustion zone 50 wherein it is ignited and burned by the preheated air. The flue gas produced by burning the gas oil fraction and having a temperature of about 3000° F. is then passed upwardly through pebble heater 20 to contact the heat-carrying balls introduced thereinto. The heated balls leave pebble heater 20 through line 21 and are recirculated to pyrolysis drum 8 via line 9 and feeder 10 to contact and effect the pyrolysis of additional raw shale. Flue gas having a temperature of about 1100° F. is removed from the top of pebble heater 20 by means of line 22 and passed to lift heater 4 wherein it contacts and preheats a stream of additional raw shale feed.

When a pebble heater is employed to heat the heat-carrying bodies in the foregoing process, it is preferred to employ a solid carbonaceous feed material yielding a pyrolysis residue containing from about 2 to about 4% combustible carbon. Where pyrolysis residue is combusted to furnish hot combustion products for heating the balls, a solid carbonaceous feed yielding a residue containing more than about 4% carbon is preferred.

Since modifications of the method and apparatus of the invention which do not depart form its scope will become apparent from the general description and specific embodiments appearing in the specification, it is intended that this invention be limited solely by the scope of the appended claims.

What is claimed is:

1. A process for the production of a substantially solids-free oil from a solid carbonaceous material comprising pyrolyzing said carbonaceous material in a pyrolysis zone at a non-cracking temperature by contacting said carbonaceous material with hotter heat-carrying bodies to provide hot spent solids and an uncracked effluent vapor containing entrained solids; recovering said solids-containing uncracked effluent vapor from said pyrolysis zone; recovering said heat-carrying bodies from said pyrolysis zone; transferring said heat-carrying bodies to a confined first solids removal zone; introducing said solids-containing uncracked effluent vapor into said first solids removal zone to contact said heat-carrying bodies therein, thereby effecting the removal of a portion of said entrained solids from said uncracked vapor; passing said uncracked vapor of reduced solids content through a second vapor-solids separation zone to effect the removal of substantially the remainder of the entrained solids from said uncracked vapor; maintaining said second vapor-solids zone at a temperature requisite to prevention of condensation of said vapor; and recovering substantially solids-free uncracked effluent vapor from said second solids separation zone.

2. The method according to claim 1 wherein said second vapor-solids separation zone is located within said first solids removal zone and maintained at a temperature requisite to prevention of condensation of said vapor by heat applied externally thereto by heat-carry bodies in said first solids removal zone.

3. The method according to claim 1 wherein said solid carbonaceous material is oil shale.

4. The method according to claim 1 wherein said heat-carrying bodies are recovered from said first solids removal zone and transferred to a heat-carrying body reheating zone; said hot spent solids are recovered from said pyrolysis zone; said spent solids are combusted to provide hot spent ash and hot combustion gases; at least a part of said hot spent ash and combustion gases are passed to said heat-carrying body reheating zone to heat said heat-carrying bodies therein; and said heated heat-carrying bodies are recirculated to said pyrolysis zone to effect the pyrolysis of fresh solid carbonaceous material introduced thereinto.

5. The method according to claim 1 wherein said heat-carrying bodies are recovered from said first solids removal zone and transferred to a heat-carrying body reheating zone; hot spent solids are recovered from said pyrolysis zone; said heat-carrying bodies in said heat-carrying body reheating zone are heated by means of heat derived from said hot spent solids under non-combustion conditions and heat derived by combusting a fuel; and said heated heat-carrying bodies are recirculated to said pyrolysis zone to effect the pyrolysis of fresh solid carbonaceous material introduced thereinto.

6. A process for the production of a substantially solids-free oil from a solid carbonaceous material comprising pyrolyzing said carbonaceous material in a pyrolysis zone at a non-cracking temperature by solid-to-solid milling contact with hotter heat-carrying bodies to obtain hot spent solids and an uncracked effluent vapor containing entrained solids; recovering said solids-containing uncracked effluent vapor from said pyrolysis zone; recovering said heat-carrying bodies from said pyrolysis zone; transferring said heat-carrying bodies to a confined solids removal zone; introducing said solids-containing uncracked effluent vapor into said solids removal zone to contact said heat-carrying bodies therein, thereby effecting the removal of a portion of said entrained solids from said vapor; passing said uncracked vapor of reduced solids content to a cyclone separator located within said confined solids removal zone to effect the removal of substantially the remainder of the entrained solids from said uncracked vapor; maintaining said cyclone separator at a temperature requisite to prevention of condensation of vapor by heat applied externally thereto by said heat-carrying bodies in said confined solids removal zone; and recovering substantially solids-free uncracked effluent vapor from said cyclone separator.

7. The method according to claim 6 wherein said solid carbonaceous material is oil shale.

8. The method according to claim 6 wherein said solid carbonaceous material and said heat-carrying bodies are passed concurrently through said pyrolysis zone.

9. The method according to claim 6 wherein said heat-carrying bodies are recovered from said confined solids removal zone and transferred to a heat-carrying body reheating zone; said hot spent solids are recovered from said pyrolysis zone; said spent solids are combusted to provide hot spent ash and hot combustion gases; at least a part of said hot spent ash and combustion gases are passed to said heat-carrying body reheating zone to heat said heat-carrying bodies therein; and said heated heat-carrying bodies are recirculated to said pyrolysis zone to effect the pyrolysis of fresh solid carbonaceous material introduced thereinto.

10. The method according to claim 6 wherein said heat-carrying bodies are recovered from said confined solids removal zone and transferred to a heat-carrying body reheating zone; said hot spent solids are recovered from said pyrolysis zone; said heat-carrying bodies in said heat-carrying body reheating zone are heated by means of heat derived from said hot spent solids under non-combustion conditions and heat derived by combusting a fuel; and said heated heat-carrying bodies are recirculated to said pyrolysis zone to effect the pyrolysis of fresh solid carbonaceous material introduced thereinto.

11. A process for the production of a substantially solids-free oil from a solid carbonaceous material comprising pyrolyzing said carbonaceous material in a pyrolysis zone at a non-cracking temperature by solid-to-solid milling contact with hotter heat-carrying bodies to provide hot spent solids and an uncracked effluent vapor containing entrained solids; recovering said solids-containing uncracked effluent vapor from said pyrolysis zone; recovering said heat-carrying bodies from said pyrolysis zone; transferring said heat-carrying bodies to a confined solids removal zone; introducing said solids-containing uncracked effluent vapor into said confined solids removal zone to contact said heat-carrying bodies therein, thereby effecting the removal of a portion of said entrained solids from said vapor; passing said uncracked vapor of reduced solids content through a cyclone separator located within said confined solids removal zone to effect the removal of substantially the remainder of the entrained solids from said uncracked vapor; maintaining said cyclone separtor at a temperature requisite to prevention of condensation of said vapor by heat applied externally thereto by heat-carrying bodies in said confined solids removal zone; recovering substantially solids-free uncracked effluent vapor from said cyclone separator; recovering said heat-carrying bodies from said solids removal zone; transferring said heat-carrying bodies to a heat-carrying body reheating zone; recovering said hot spent solids from said pyrolysis zone; combusting said spent solids to provide hot spent ash and hot combustion gases; passing at least a part of said hot spent ash and combustion gases through said heat-carrying body reheating zone to contact and directly heat said heat-carrying bodies therein; and recirculating said heated heat-carrying bodies to said pyrolysis zone to effect the pyrolysis of fresh solid carbonaceous material introduced thereinto.

12. The method according to claim 11 wherein said solid carbonaceous material is oil shale.

13. The method acording to claim 11 wherein said solid carbonaceous material and said heat-carrying bodies are passed concurrently through said pyrolysis zone.

14. The method according to claim 11 wherein said combustion of said hot spent solids is carried out in a fluidized solids combustion zone.

15. The method according to claim 11 wherein said combustion of said hot spent solids is carried out by entraining and combusting said spent solids in a gas lift line.

16. The method according to claim 11 where said heat-carrying body reheating zone is in the form of a pebble heater.

17. The method according to claim 11 wherein said heat-carrying bodies in said heat-carrying body reheating zone are fluidized by said hot combustion gases.

18. The method according to claim 11 wherein said combustion gases are recovered after being passed through said heat-carrying reheating zone and the residual sensible heat thereof is employed to preheat said solid carbonaceous material prior to said carbonaceous solid being introduced into said pyrolysis zone.

19. A process for the production of a substantially solids-free oil from a solid carbonaceous material comprising pyrolyzing said carbonaceous material in a pyrolysis zone at a non-cracking temperature by solid-to-solid milling contact with hotter heat-carrying bodies to provide hot spent solids and an uncracked effluent vapor containing entrained solids; recovering said solids-containing uncracked effluent vapor from said pyrolysis zone; recovering said heat-carrying bodies from said pyrolysis zone; transferring said heat-carrying bodies to a confined solids removal zone; introducing said solids-containing uncracked effluent vapor into said confined solids removal zone to contact said heat-carrying bodies therein, thereby effecting the removal of a portion of said entrained solids from said vapor; passing said uncracked vapor of reduced solids content through a cyclone separator located within said confined solids removal zone to effect the removal of substantially the remainder of the entrained solids from said uncracked vapor; maintaining said cyclone separator at a temperature requisite to prevention of condensation of said vapor by heat applied externally thereto by said heat-carrying bodies in said confined solids removal zone; recovering substantially solids-free uncracked effluent vapor from said cyclone separator; recovering said heat-carrying bodies from said solids removal zone; transferring said heat-carrying bodies to a heat-carrying body reheating zone; recovering said hot spent solids from said pyrolysis zone; directly heating said heat-carrying bodies in said heat-carrying body reheating zone by means of heat derived from said spent solids under non-combustion conditions and heat derived by combusting a portion of said effluent vapor; and recirculating said heated heat-carrying bodies to said pyrolysis zone to effect the pyrolysis of fresh solid carbonaceous material introduced thereinto.

20. The method according to claim 19 wherein said solid carbonaceous material is oil shale.

21. The method according to claim 19 wherein said solid carbonaceous material and said heat-carrying bodies are passed concurrently through said pyrolysis zone.

22. The method according to claim 19 wherein said heat-carrying body reheating zone is in the form of a pebble heater.

23. The method according to claim 19 wherein said heat-carrying body reheating zone is in the form of a fluidized solids unit.

24. The method according to claim 19 wherein said carbonaceous solid leaves upon pyrolysis a spent solid residue containing less than about 5% by weight combustible matter.

25. The method according to claim 19 wherein said heat-carrying bodies are heated by entraining at least a part of said hot spent solids in a gas lift zone with a cooler combustion-supporting gas, said gas being heated thereby, separating said spent solids in an unburned state from said heated combustion-supporting gas, combusting said effluent vapor portion with said heated gas to produce a hot flue gas, and passing said hot flue gas through said heat-carrying body reheating zone to thereby heat said heat-carrying bodies therein.

26. The method according to claim 19 wherein hot flue gas obtained by said combustion of said effluent vapor portion is passed through said heat-carrying body reheating zone and recovered, and the residual sensible heat of said recovered flue gas is employed to preheat said solid carbonaceous material prior to said material being introduced into said pyrolysis zone.

27. An apparatus comprising a chamber having inlet means in the uppermost portion thereof for introduction of heated solid material and dust-containing condensible vapor, a solids outlet positioned in the lower portion of said chamber, a vapor-solids separation means located within said chamber and entirely below said inlet means and spaced from the walls thereof, a vapor inlet to the vapor-solids separation means in communication with said chamber, a solids outlet from the vapor-solids separation means in communication with said chamber, and a vapor outlet from said vapor-solids separation means leading to the exterior of said chamber.

28. The apparatus according to claim 27 wherein said chamber is provided with a baffle member spaced from the walls thereof and positioned above said vapor-solid separation means.

29. An apparatus for removing dust from a condensible vapor comprising a chamber, a common inlet in the uppermost portion of said chamber for introduction of heated solid material and a dust-containing condensible vapor, a solids outlet positioned in the lower portion of said chamber, a cyclone separator located within said chamber and entirely below said common inlet and spaced from the walls thereof, a vapor inlet to said cyclone separator in communication with said chamber, a solids outlet from said cyclone separator in communication with said chamber, and a vapor outlet from said cyclone separator leading to the exterior of said chamber.

30. The apparatus according to claim 29 wherein said chamber has a vapor collecting means therein consisting of an inwardly and downwardly extending baffle member extending at least part way about the inner walls of said chamber, said vapor collecting means having at least one vapor outlet communicating with said vapor inlet to said cyclone separator.

31. The apparatus according to claim 29 wherein said chamber is provided with a baffle member spaced from the walls thereof and positioned above said cyclone separator.

32. An apparatus for removing dust from a dust-containing condensible vapor comprising, in combination:
 (1) a vapor solids contacting chamber;
 (2) a source of heated solid material external to said chamber;
 (3) conduit means communicating with said source and the uppermost portion of said chamber for introducing heated solid material into said chamber;
(4) a source of said dust-containing, condensible vapor external to said chamber;
(5) conduit means communicating with said source (4) and the uppermost portion of said chamber for introducing dust-containing, condensible vapor into said chamber and into intimate contact with heated, solid material contained in said chamber;
(6) vapor-dust separation means located entirely below said conduit means;
(7) conduit means communicating with said chamber and said vapor-dust separation means (6) adapted to introduce vapor from intimate contact with heated, solid material in said chamber into said vapor-dust separator means; and
(8) means for maintaining an elevated temperature in said vapor-dust separator means.

33. An apparatus in accordance with claim 32 wherein said conduit means (3) and said conduit means (5) communicate with the uppermost portion of said chamber through a common inlet.

34. An apparatus in accordance with claim 32 wherein a vapor collecting means is positioned within said chamber communicating through conduit means (7) with said vapor-dust separation means (6).

35. An apparatus for removing dust from a dust-containing condensible vapor comprising, in combination:
(1) a vapor-solids contacting chamber;
(2) a source of heated, solid material external to said chamber;
(3) a source of said dust-containing condensible vapor external to said chamber;
(4) conduit means communicating with said sources (2) and (3) and said chamber adapted to introduce heated, solid material and dust-containing condensible vapor into the uppermost portion of said chamber through a common inlet;
(5) a cyclone separator located within said chamber, entirely below said conduit means, spaced from the walls thereof, and in heat-exchange relation with heated, solid material contained in said chamber, said cyclone separator adapted to separate entrained dust from a vapor;
(6) a vapor collecting means positioned between the walls of said chamber and said cyclone separator, said vapor collecting means comprising a baffle member generally disposed inwardly from said chamber walls and away from the vapor inlet to said chamber;
(7) conduit means communicating with said vapor collecting means (6) and said cyclone separator (5) for introducing collected vapor into said cyclone separator; and
(8) conduit means communicating with the vapor outlet of said cyclone separator and the exterior of said chamber.

36. A two-stage apparatus for removing entrained solids from an entrained solids-containing, condensible vapor comprising, in combination:
(1) a first means defining a chamber for maintaining a bed of heated solid material at an appreciable depth whereby removal of a portion of said entrained solids from said vapor is effected by passing said vapor through said bed;
(2) inlet conduit means communicating with the uppermost portion of said first means for introducing said heated solid material into said first means;
(3) inlet conduit means communicating with the uppermost portion of said first means for introducing said entrained solids-containing, condensible vapor into said first means and into intimate contact with said heated, solid material;
(4) a solids outlet positioned in the lower portion of said first means and communicating with the exterior thereof;
(5) a second means disposed within said first means and spaced from the walls thereof and entirely below said conduit means for effecting substantially complete removal of the remaining portion of said entrained solids from said vapor;
(6) conduit means communicating with said first means and said second means for introducing vapor from intimate contact with said heated, solid material into said second means;
(7) a solids outlet from said second means communicating with the interior of said first means, and
(8) a vapor outlet from said second means communicating with the exterior of said first means.

37. A two-stage apparatus for removing entrained solids from an entrained solids-containing, condensible vapor comprising, in combination:
(1) a first means defining a chamber for maintaining a bed of heated solid material at an appreciable depth whereby removal of a portion of said entrained solids from said vapor is effected by passing said vapor through said bed;
(2) a source of heated solid material external to said first means;
(3) inlet conduit means communicating with said source (2) and the uppermost portion of said first means for introducing said heated solid material into said first means;
(4) a source of said entrained solids-containing, condensible vapor external to said first means;
(5) inlet conduit means communicating with said source (4) and the uppermost portion of said first means for introducing said entrained solids-containing, condensible vapor into said first means and into intimate contact with said heated, solid material;
(6) a solids outlet positioned in the lower portion of said first means and communicating with the exterior thereof;
(7) a cyclone separator located within said first means entirely below said conduit means and spaced from the walls thereof, and in heat-exchange relation with heated, solid material contained in said first means, said cyclone separator adapted to separate entrained solids from a vapor;
(8) a vapor collecting means positioned between the walls of said first means and said cyclone separator, said vapor collecting means comprising a baffle member generally disposed inwardly from the walls of said first means and away from the vapor inlet to said first means;
(9) conduit means communicating with said vapor collecting means (8) and said cyclone separator (7) for introducing collected vapor into said cyclone separator;
(10) conduit means communicating with the vapor outlet of said cyclone separator and the exterior of said first means, and
(11) a solids outlet from said cyclone separator communicating with the interior of said first means.

References Cited by the Examiner

UNITED STATES PATENTS

| | | | |
|---|---|---|---|
| 1,159,267 | 11/1915 | Posner | 55—345 |
| 2,549,117 | 4/1951 | Nelson | 208—48 |
| 2,913,392 | 11/1959 | Ricards | 208—149 |
| 2,934,489 | 4/1960 | Canevari | 208—48 |
| 2,943,993 | 7/1960 | Sykes | 208—48 |
| 3,008,894 | 11/1961 | Culbertson | 208—11 |
| 3,034,979 | 5/1962 | Nevens | 208—11 |
| 3,058,903 | 10/1962 | Otis | 208—11 |

DELBERT E. GANTZ, *Primary Examiner.*

ALPHONSO D. SULLIVAN, *Examiner.*